United States Patent
Cheong et al.

(10) Patent No.: US 9,039,554 B2
(45) Date of Patent: May 26, 2015

(54) POWER TRANSMISSION BELT

(75) Inventors: Tae Hee Cheong, Troy, MI (US); Duane A. Junker, Boone, NC (US)

(73) Assignee: Gates Corporation, Denver, CO (US)

( * ) Notice: Subject to any disclaimer, the term of this patent is extended or adjusted under 35 U.S.C. 154(b) by 938 days.

(21) Appl. No.: 12/323,238

(22) Filed: Nov. 25, 2008

(65) Prior Publication Data

US 2009/0149289 A1 Jun. 11, 2009

Related U.S. Application Data

(60) Provisional application No. 60/992,669, filed on Dec. 5, 2007.

(51) Int. Cl.
*F16G 5/06* (2006.01)
*F16G 5/20* (2006.01)

(52) U.S. Cl.
CPC ... *F16G 5/06* (2013.01); *F16G 5/20* (2013.01)

(58) Field of Classification Search
CPC ..................................... F16G 5/06; F16G 5/20
USPC ......... 474/260, 261, 263, 191, 153, 237, 204, 474/205, 238
See application file for complete search history.

(56) References Cited

U.S. PATENT DOCUMENTS

| | | |
|---|---|---|
| 4,798,566 A | 1/1989 | Sedlacek |
| 5,127,886 A | 7/1992 | Fujiwara et al. |
| 5,197,928 A | 3/1993 | Mishima et al. |
| 5,413,538 A | 5/1995 | Mishima |
| 5,415,594 A | 5/1995 | Kitahama et al. |
| 5,498,212 A | 3/1996 | Kumazaki |
| 5,501,908 A | 3/1996 | Shioyama et al. |
| 5,904,630 A | 5/1999 | Berthelier |
| 6,432,013 B1 * | 8/2002 | Tani et al. ........... 474/263 |
| 6,435,997 B1 | 8/2002 | Kurose et al. |
| 6,482,118 B1 * | 11/2002 | Watanabe et al. ...... 474/263 |
| 6,679,962 B2 * | 1/2004 | Kurose et al. ......... 474/263 |
| 6,695,735 B2 | 2/2004 | Tani et al. |
| 7,128,674 B2 | 10/2006 | Teves et al. |

FOREIGN PATENT DOCUMENTS

| | | |
|---|---|---|
| JP | 04-348930 A | 12/1992 |
| JP | 05-8294 A | 1/1993 |
| JP | 2007-092880 A | 4/2007 |

OTHER PUBLICATIONS

International Search Report and Written Opinion, PCT/US2008/013124, Jun. 26, 2009.

* cited by examiner

*Primary Examiner* — William A Rivera
(74) *Attorney, Agent, or Firm* — Paul N. Dunlap, Esq.; Jeffrey A. Thurnau, Esq.

(57) ABSTRACT

A power transmission belt comprising cord, elastomeric undercord, at least one pair of opposing v-shaped pulley contact surfaces, and having discontinuous fiber embedded in the undercord, some of which protrude from a contact surface. The fiber comprises deformable polymer, such as nylon, and the fiber protrusions are substantially erect with respect to the surface and substantially straight or slightly bowed, especially near the free end, and the fiber protrusions are deformed from an original cross-sectional shape, which may be substantially round or oval or the like, to an elongated, oval, oblong, kidney, or flattened circle shape. The protruding fiber length is at least two fiber diameters.

24 Claims, 2 Drawing Sheets

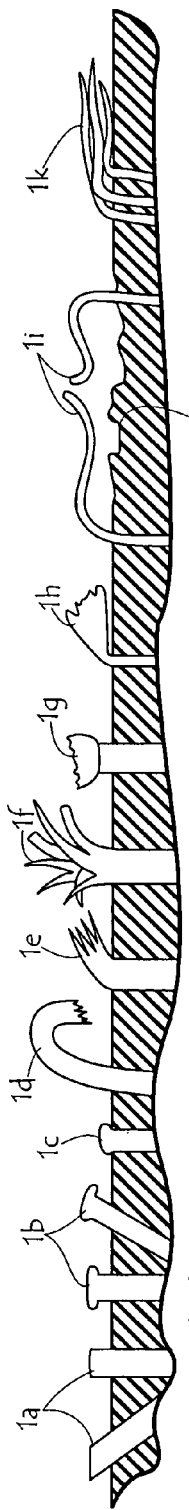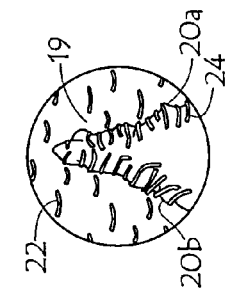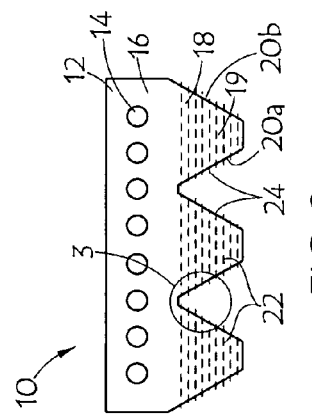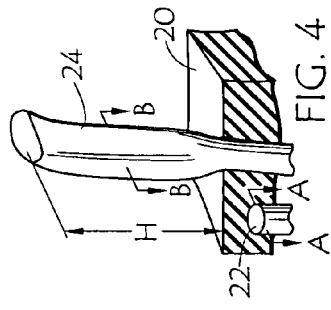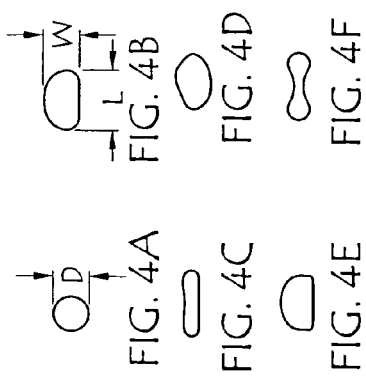

POWER TRANSMISSION BELT

BACKGROUND OF THE INVENTION

1. Field of the Invention

This invention relates generally to a multi-v-ribbed power transmission belt, more particularly to a v-ribbed belt having protruding fiber at a pulley-contacting surface, and specifically to a belt having protruding deformable fibers which stand erect or slightly bowed and which are deformed into an oval cross-sectional shape.

2. Description of the Prior Art

Power transmission belts such as v-belts, multi-v-ribbed belts and flat belts rely on friction between a contact surface and a pulley or sheave to transmit power from a driver sheave to the belt surface and thence to a driven sheave. A typical belt construction includes a tensile member, an elastomeric belt body having discontinuous synthetic thermoplastic and/or natural fibers embedded therein, and a pulley contact surface. A rubber contact surface may generate a high friction coefficient and may be associated with undesirable frictional noises. Exposure of the ends of the embedded fibers at the contact surface may reduce the friction coefficient or otherwise control friction and may alleviate some noise problems. Accordingly various configurations of exposed fibers have been tried.

Japanese Unexamined Patent Publication H04-348930 discloses a method of polishing the surface of a rubber structure having short thermoplastic fibers so as not to soften and melt the short fibers. The short fibers disclosed in that publication are illustrated by fibers 1a in FIG. 1 which do not appear to protrude more than about one fiber diameter. Disclosed as prior art in that publication are similar fibers with melted ends as illustrated by fibers 1b in FIG. 1.

Japanese Unexamined Patent Publication H05-8294 discloses as prior art nylon fiber ends that are round and have hardly come out from the surface as illustrated by fiber 1c in FIG. 1. Also disclosed in that publication is a rubber structure with meta-aramid staple fibers with a long extension from a surface and lots of curl as illustrated by fiber 1d in FIG. 1, resulting in increased fiber occupancy area and a surface with low coefficient of friction. Also disclosed in that publication is a rubber structure with para-aramid or cotton staple fibers with a short extension from a surface and split ends illustrated by fiber 1e in FIG. 1, resulting in a surface with high coefficient of friction.

U.S. Pat. No. 5,498,212 discloses a power transmission belt having embedded aramid fibers. The exposed ends of para-aramid fibers are fibrillated and tend to curl as illustrated by fiber 1f in FIG. 1.

U.S. Pat. No. 5,197,928 discloses a v-ribbed power transmission belt having embedded synthetic or natural fibers. The exposed surface of the belt fibers is flared by melting or other method so that its effective diameter is increased over the undeformed cross-sectional area of the body of the fibers as illustrated by fiber 1g in FIG. 1.

U.S. Pat. No. 5,413,538 discloses a v-ribbed power transmission belt having synthetic or natural fibers embedded in the belt body, no significant number of which project from the pulley-engaging surface, and embedded aramid fibers which do project from the same surface. If any non-aramid fibers project from the surface, it is characterized as stubble.

U.S. Pat. No. 5,904,630 discloses a machined, molded, ribbed, power transmission belt having embedded natural or synthetic fibers. Surplus material 0.1 to 0.3 mm thick is machined from the ribs so as to uncover protruding ends of the fibers. There is significant dispersion in directions of the fibers.

U.S. Pat. No. 6,435,997 discloses a v-ribbed belt having synthetic fibers protruding from a rib face. The extruded section of the fiber is plastically deformed in the shape of sectors gradually broadened toward their distal ends as illustrated by fiber 1h in FIG. 1. The fiber is kept unmelted and formed at its distal end in the shape of waves. The rib surface has microscopic unevenness with a level difference of 0.5 to 10 μm as illustrated by unevenness 1j in FIG. 1, and preferably with a wavy shape.

U.S. Pat. No. 6,695, 735 discloses a v-ribbed belt having short aramid fibers protruding from a rib face. The root portions of the extruded short fibers are raised form the face, and the tip portion is bowed in a different direction from its medial portion as illustrated by fibers 1i in FIG. 1. The bowing directions of fibers differ from one another to decentralize the orientation thereof.

U.S. Pat. No. 4,798,566 discloses a raw-edge power transmission belt having embedded discontinuous aramid fibers with protruding portions bent against the elastomeric body portion of the belt in such a manner as to expose lateral side portions of fiber which define part of the friction driving surface as illustrated by fibers 1k in FIG. 1. Most of the aramid fibers protrude from 0.1 to 0.3 mm.

SUMMARY

The present invention is directed to a power transmission belt with embedded deformable fibers having an embedded cross-sectional shape that is substantially undeformed from the fiber's original shape, while the protruding fiber is substantially erect with respect to the contact surface or slightly bowed, and along substantially all the protruding length the protruding fiber is deformed from the original cross-sectional shape to an elongated, oval, or flattened shape.

The present invention is directed to a power transmission belt having a tensile member, an elastomeric belt body having a plurality of discontinuous fibers embedded therein, and a pulley contact surface. Each embedded fiber has an embedded cross-sectional shape that is substantially undeformed from its original cross-sectional shape and characterized by an average fiber diameter, and a plurality of fiber ends protrude from the contact surface with a protruding length and a protruding cross-sectional shape. The fibers comprise deformable polymeric material. The fibers may be of thermoplastic or thermally deformable polymer, whether synthetic or natural. A plurality of protruding fiber ends are substantially erect with respect to the contact surface, substantially straight or slightly bowed, and substantially uniformly deformed from the original cross-sectional shape along most of the protruding length.

The protruding length of the fibers may be at least 2 average fiber diameters, or from about 5 to about 20 average fiber diameters, or from about 0.1 to about 0.6 mm, or from 0.15 to about 0.3, or at least about 0.2 mm or more.

In various embodiments of the present invention, the plurality of protruding fiber ends may be deformed from a substantially round original cross-sectional shape to one or more of an oval, kidney, oblong, semicircular, and flattened circle cross-sectional shape. In other embodiments, protruding fiber portions may be deformed from an original oval or dumbbell shape to a flattened or more elongated oval or dumbbell shape.

The discontinuous fibers may have an average length from about 0.5 to about 5 mm, or an average length of about 1 to about 3 mm. The discontinuous fibers may have an average diameter, or if not round, an average major dimension, of about 10 to about 50 microns, or from about 15 or about 20 to about 30 microns.

The deformable fiber may be one or more selected from the group consisting of nylon, acrylic, polyester, polyketone, polyolefin, and meta-aramid. The deformable fiber may be a thermally deformable synthetic thermoplastic polymer fiber. The deformable fiber may have a softening point of greater than about 100° C., or greater than about 180° C., or from about 190° C. to about 350° C.

The deformed cross-sectional shape of the protruding portions of the fibers may be characterized by a ratio of a major dimension to a minor dimension in the range from 1.1 or 1.2 to about 5, or from about 2 to about 3, or may be characterized by deformation from a circular diameter by factors of about 1.33 and about 0.67 for the major and minor dimensions respectively. In various embodiments of the present invention, the deformation of the protruding fiber cross-sectional shape may be characterized by a major dimension that is elongated from the original shape by about 10% to about 100%, or from about 20% to about 50%, or about 30%.

The elastomeric belt body may be of one or more of EPDM, EPM, SBR, NR, BR, CR, NBR, HNBR, ethylene-alpha-olefin elastomer, and the like.

The average surface roughness of the contact surface may be more than 10 microns, preferably more than 20 microns, or about 50 microns and irregular.

The amount of embedded fiber in the elastomeric belt body may be from about 1 to about 50 phr, or about 5 to about 30 phr, based on 100 parts of elastomer. The number of exposed fibers on the contact surface may be in the range from 20 to 150 fibers per $mm^2$ or 50 to 100 fibers per $mm^2$, or about 75 fibers/$mm^2$.

The fibers may be bent at the roots so that at least a portion of the protruding portions lie substantially parallel to the rubber surface or even touching the rubber surface. At least some of the bent fibers may have a substantially erect portion at the free end.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings:

FIG. 1 is a fragmented sectional diagram of various prior art fiber configurations.

FIG. 2 is a sectional diagram of a portion of a multi-V-ribbed belt constructed in accordance with an embodiment of the present invention;

FIG. 3 is a magnified sectional view of a portion of the belt of FIG. 2;

FIG. 4 is a partially fragmented perspective view of a portion of a belt constructed in accordance with an embodiment of the present invention;

FIGS. 4A-4F are cross-sections of exposed fiber according to embodiments of the present invention;

DETAILED DESCRIPTION

Figure 5:
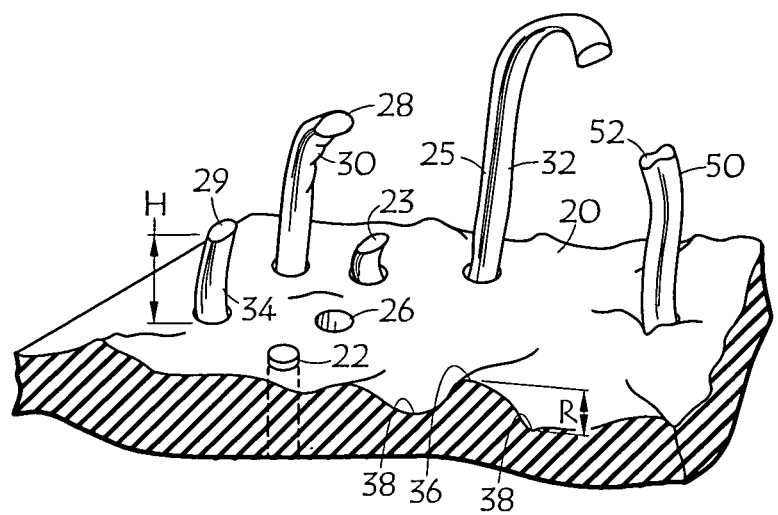
FIG. 5 is a partially fragmented perspective view of a portion of a belt constructed in accordance with an embodiment of the present invention.

Referring to FIG. 2, a power transmission belt in the form of multi-V-ribbed belt 10 in accordance with an embodiment of the present invention is shown generally. Multi-V-ribbed belt 10 includes at least one longitudinally extending tensile member or load-carrying cord 14 positioned below overcord layer 12 on the back side of the belt and above elastomeric main belt body portion 18, also known as the undercord layer. The tensile member may be at least partially in contact with or embedded in adhesive rubber member 16 which is frequently visually indistinguishable from the surrounding elastomeric belt body portion except in cases, e.g., where one and not the other of adhesive rubber member 16 and undercord 18 is fiber loaded. Main belt body portion 18 includes rib 19 and sheave or pulley contact surface 20. The word, "sheave" as used in this context includes conventional pulleys and sprockets used with a power transmission belt, and also rollers and like mechanisms. The particular sheave contact portion of the belt of FIG. 2 is in the form of a plurality of ribs 19 having there between oppositely facing sides 20a and 20b. Sheave contact portion 20 is integral with rib 19 and main belt body portion 18 and may be formed from the same elastomeric, fiber-loaded material(s) as described below. Adhesive rubber member 16 around cord 14, overcord 12, undercord 18, and/or rib 19 may actually be of the same material, or they may be of different materials. At least a portion of rib 19 and contact portion 20 comprise a plurality of embedded short or discontinuous fibers 22, at least some of which have protruding portions 24 which protrude from contact portion 20.

FIG. 3 shows a magnified portion of two ribs 19 with embedded fibers 22 and protruding fiber portions 24 from pulley contact surfaces 20a and 20b according to an embodiment of the invention. Each embedded fiber has an embedded cross-sectional shape that is undeformed from its original shape and characterized by an average fiber diameter and/or major and minor dimensions, and a plurality of fiber ends protrude from the contact surface with a protruding length and a protruding cross-sectional shape. Many or most of the protruding fiber ends 24 are substantially erect with respect to the contact surface, and substantially straight or slightly bowed. In other words, most of the protruding fibers are not bent at or near the roots, so they stand substantially erect with respect to the elastomeric surface from which they protrude. If protruding fibers are bowed, the bow is generally in the longitudinal direction of the belt, and the bow is generally unidirectional. Generally the longer the protruding portion, the more bow may be exhibited. The protruding fiber ends are not split, and the protruding fibers are not splayed or melted or flared, but are of relatively uniform cross-section along substantially all the protruding length.

FIG. 4 shows a greatly magnified view of a portion of single protruding fiber 24 and a portion of embedded fiber 22. Embedded fiber 22 and the embedded portion of protruding fiber 24 have a substantially round cross-sectional shape with average diameter "D" as shown in the sectional view of FIG. 4A. Protruding fiber portion 24 has protruding length "H" and is deformed from the round cross-sectional shape of the embedded fibers and embedded portions of protruding fibers along most of its protruding length. The deformation of portion 24 may be substantially uniform along most or substantially all of its protruding length. In various embodiments of the present invention, the protruding fiber ends may be deformed from the substantially round shape to one or more of an oval, kidney, oblong, semicircular, and flattened circle cross-sectional shape. An example oval cross-sectional shape is shown in FIG. 4D. By oval is meant generally any deviation from circular including oblong, elliptical, egg-shaped, kidney-shaped, dumbbell-shaped, or the like, whether symmetrical or not. What is not meant by oval is a very flat, thin, film-like shape. An example kidney cross-sectional shape is shown in FIG. 4B. Kidney shape may include shapes with a convex portion and a concave portion. An example oblong cross-sectional shape is shown in FIG. 4C. Oblong is not used herein in a precise sense, but is generally suggestive of an oval shape that is longer and thinner, and/or more deformed from circular, than other, more typical oval shapes. FIG. 4E shows an example of a flattened circular cross-sectional shape. Though shown in FIG. 4E with sharp corners, a flattened circular shape may have somewhat rounded corners according to an embodiment of the invention. Finally, FIG. 4F shows an example of a dumbbell shape, which may be considered to be like a kidney shape, but with two concave sides, or like a peanut shape. FIG. 4F may also be considered a two-lobed example of a more general class of multi-lobed shapes. In each case, the deformed cross-sectional shape of the protruding fiber may thus have a major or larger dimension and a minor or smaller dimension. In FIG. 4B, for example, the major dimension is indicated as "L" and the minor dimension as "W". The deformed cross-sectional shape of the protruding portions of the fibers may thus be characterized by a ratio of a major dimension to a minor dimension, or L/W. In preferred embodiments of the invention, the cross-sectional shape of the protruding portion may have a ratio, L/W, in the range from about 1.1 to about 5, or in the range from about 1.2 to about 5, or the ratio may in the range from about 2 to about 3. Alternately, the cross-sectional shape of the protruding portion may be characterized by an amount of deviation from an original circular diameter exhibited by the major and minor dimensions, i.e. L/D and W/D, respectively. In preferred embodiments of the invention, the cross-sectional shape may be characterized by factors of about 1.33 and about 0.67 for L/D and W/D, respectively.

Alternately, embodiments of the invention may be characterized by an original non-circular shape having a major dimension and minor dimension, such as indicated in FIG. 4B. For such non-round fibers, the deformation of the protruding fiber ends may more conveniently be characterized by percent elongation of the major dimension. Thus, a major dimension of the protruding cross-sectional shape may preferably be elongated from that of the original shape by from about 5% or 10% to about 100%, or about 30%. An example of such a non-round fiber is Nomex meta-aramid fiber, which has a two-lobed or dumbbell cross-sectional shape as illustrated in FIG. 4F. It has been found that belts with exposed Nomex fiber at a contact surface having a major dimension ranging from 5% to 20% greater than the original shape have excellent noise performance and durability in belt testing. FIG. 5 illustrates a protruding fiber 50 of original two-lobe- or dumbbell-shaped cross section 52.

Without intent to limit the invention, it is believed that the advantage of an elongated or oval cross-sectional shape is that the exposed surface area of the fiber can be increased without significant accompanying decrease in fiber strength or durability. The length of the protruding fiber can be maximized without a decrease in strength or durability of the fiber. The combination of maximized protruding length and somewhat increased major cross-sectional dimension results in a large increase of exposed surface area for a given amount of fiber in the elastomer composition. This may be advantageous because increasing the amount of fiber too much in an attempt to increase exposed fiber surface can have detrimental effects on other properties of the rubber. Likewise, increasing fiber exposed surface area of fiber by splaying or making the fibers too thin can have detrimental effects on fiber wear resistance, strength, or other properties of the surface fiber. Increased exposed fiber surface area as contemplated by the present invention may be advantageous for control of noise and frictional characteristics of the belt contact surface, without some of the detrimental effects of prior art methods.

It is believed that belts according to embodiments of the present invention initially run very quiet with the cushioning effect of the erect protruding fibers. Moreover, it is believed these belts continue to run quiet because of the thickness of fiber material between pulley and rubber surface, even if the fibers become bent over onto the rubber surface due to some handling or processing or during use. It is believed that the erect fibers of embodiments of the present invention generally bend over in use, laying on the rubber contact surface in substantially parallel and unidirectional fashion, although some fiber crossing may also occur. Thus, while the contact surface is herein referred to as an elastomeric or rubber surface of the belt body, the protruding fibers actually make up perhaps a more significant aspect of the contact surface. Rubber itself generally has very high friction coefficient relative to fibers. In embodiments of the present invention, bent over fibers of sufficient thickness, length, and density reside between, and prevent direct contact between, the rubber portion of the contact surface and a pulley or sheave surface. Also, a series of oval or rounded fibers may present a relatively rough friction surface, which has also been found favorable for reducing noise. Moreover, the thickness of the fibers makes them strong, durable, and/or resistant to abrasive wear. In contrast, prior art fibers may be too short, splayed, fibrillated and/or made too thin or flat to have long lasting resistance to abrasive wear or to prevent contact between rubber surfaces and pulley surfaces or to present a very rough contact surface.

The protruding length "H" of the fibers may be at least 2 fiber diameters, or from about 5 to about 20 fiber diameters, or from about 0.1 to about 0.5 mm, or from about 0.2 mm to about 0.3 mm. Generally, the longer the protruding portions of the fibers, the better the belt performance as described below. However, the maximum protruding length attainable may be limited by practical considerations. For example, if insufficient portions of fiber remain embedded in the belt body, then the fiber will most likely pull out of the contact surface and make no contribution to belt performance. In one embodiment, it has been observed that 1-mm long nylon fibers may protrude a maximum of about 0.4 mm, or about half the fiber length, before fiber pull-out becomes a significant problem. Pull-out may also be affected by adhesion or lack thereof between fiber and elastomer composition.

The discontinuous fibers may have an average length from about 0.5 to about 5 mm, or an average length of about 1 mm to about 3 mm. The discontinuous fibers may have an original average diameter of about 10 microns to about 50 microns, or an average diameter of about 20 microns to about 30 microns. Fibers of non-circular cross-sectional shape may preferably have an original major dimension of about 10 microns to about 50 microns, or from about 15 microns to about 30 microns.

The deformable fiber may be one or more selected from the group consisting of nylon, acrylic, polyester, polyolefin, polyketone, and meta-aramid. The deformable fiber may be a thermally deformable synthetic thermoplastic polymer fiber. The deformable fiber may have a softening point of greater than about 100° C., or greater than about 190° C., or from about 180° C. to about 350° C. The deformable fiber need not have a true melting point, as long as some softening accompanied by thermal deformation is possible to produce the required deformation in cross-sectional shape of the fiber.

Examples of useful fibers for embodiments of the present invention include: nylon-66 with softening point of about 240° C.; nylon-6 with softening point of about 180° C.; Nylon-46 with softening point of about 260-270° C.; polyester with softening point of about 255° C.; Nomex® meta-aramid sold by DuPont or TeijinConex meta-aramid sold by Teijin Ltd. with softening point of about 280° C.; and acrylic with softening point of about 240° C., or the like. A preferred fiber is nylon, including nylon-66, nylon-6, and/or nylon-46. The fibers may be medium or high-tenacity nylon. Fibers may include oxidative or heat stabilizers, lubricants, or other minor additives. Fibers may be treated with resorcinol-formaldehyde-latex (RFL), isocyanate, or other adhesive treatment to improve adhesion and reduce pull-out during profile processing or subsequent use. Acrylic is an example of a useful fiber which is considered to decompose before melting, yet considered to soften before decomposition occurs and thus be thermally deformable. Polyacrylonitrile ("PAN") fibers are sold, for example, by Toyobo Co. Ltd. PAN fibers include fibers with a range of acrylic content, generally at least 85% acrylonitrile, and various comonomers, such as methyl methacrylate, vinyl acetate, and the like. Nomex meta-aramid also has a softening point or at least a point at which some thermal deformation is possible. Olefin fibers include polyethylene, ultra-high molecular weight polyethylene, polypropylene, and the like. Polyketones include polyetherketones (PEK), polyetheretherketones (PEEK), polyetherketoneketones (PEKK), and polyaryletherketones (PAEK), polyolefin ketone (POK), and the like, (collectively "PK"). Polyesters include polyethylene terephthalate (PET), polyethylene naphthalate (PEN), and the like. PEN is sold under the trademark PENTEX by Honeywell International Inc. PEN is also sold by Teijin Limited, INVISTA, and Hyosung Corporation. It is believed para-aramid fibers are not sufficiently thermally deformable to be practical in carrying out the present invention, although some mechanical deformation may be possible with some advantageous effect.

The rubber or elastomeric material of the surface may present a smooth surface from which fibers protrude. Alternately, as shown in FIG. 5, surface 20 may have irregular peaks 36 and valleys 38, resulting in an average roughness characterized by an average height difference "R". The average surface roughness of the contact surface may advantageously be more than 10 microns, preferably from about 20 to about 100 microns, or about 50 microns, and irregular. It is believed that such roughness and/or irregularity contributes to the ability of the belt to run quietly in a sheave. It is hypothesized that the roughness and irregularity of the surface serves to support or elevate above the surface any fibers which are bent as described above and thereby to further prevent noise-producing contact between a pulley and the rubber surface.

The elastomeric belt body may include one or more elastomeric formulations based on one or more of ethylene-propylene elastomers (EPDM, EPM, and the like), styrene-butadiene rubber (SBR), chloroprene (CR), natural rubber (NR), butyl rubber (BR), nitrile (NBR), hydrogenated nitrile (HNBR), ethylene-alpha-olefin elastomer, or the like. Each elastomeric formulation may include one or more of plasticizers, reinforcing fillers including additional natural or synthetic short fibers, extenders, antioxidants, antiozonants, process aids, adhesion promoters, accelerators, coagents, curatives, and the like.

The amount of embedded short or discontinuous fiber in the elastomeric belt body may be from about 1 to about 50 phr, or about 5 to about 30 phr, based on 100 parts of elastomer. The number of exposed fibers on the contact surface may advantageously be in the range from 20 to 150 fibers per $mm^2$, or from 50 to 100 fibers per $mm^2$, or about 75 fibers/$mm^2$.

FIG. 5 illustrates some of the variety of fiber ends protruding from rubber surface 20 that may by included in embodiments of the present invention. As mentioned above, non-circular fiber 50 has a dumbbell shaped cross section 52. The other fibers illustrated in FIG. 5 have originally round cross-sections like the embedded fiber 22. Fiber 23 does not protrude as much as preferred, but may be just enough, at an H/D ratio of about 2 or a couple fiber diameters, to have a positive effect on belt performance. Fiber 34 protrudes an amount indicated by height "H", which is several times a fiber diameter. Fiber 34 also has an oval cross section 29 and substantially uniform cross section along most of the protruding length. Fiber 30 is substantially erect, has a greater protruding length than fiber 34, and is slightly bowed near the exposed end. Fiber 30 has deformed oval cross section 28. Fiber 25 protrudes even farther than fiber 30 resulting in a little more bowing near fiber end 40. Fiber 25 also has a substantially uniform flattened circular cross section 32. Hole 26 indicates a round fiber was pulled out of the rubber.

Figure 6:
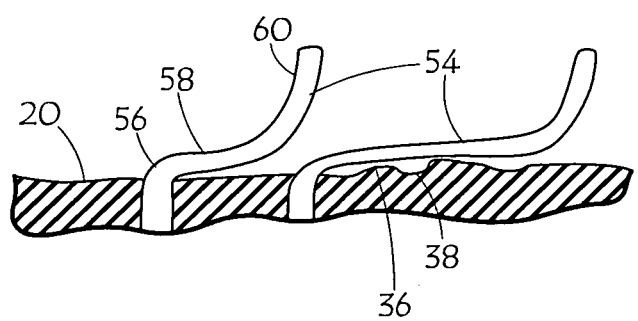
FIG. 6 is a fragmented sectional diagram of exposed fiber configurations according to embodiments of the invention.

FIG. 6 illustrates other fiber forms or protruding fiber configurations according to another embodiment of the invention. FIG. 6 shows bent fibers 54 parallel to or touching surface 20. Fibers 54 are bent at root 56, have parallel or touching section 58, and end with a substantially erect portion 60 at the free end. Preferably, erect portion 60 is at least as long as two times the average fiber diameter. In other aspects, not shown, the fibers may have the same kinds of features described above, including substantially uniform deformed cross sections in the protruding length. The fibers may be bent as a result of manufacturing conditions, or post-manufacturing use or handling. FIG. 6 also illustrates how one or more high spots 36 on rubber surface 20 may support fiber 54, as suggested above. It should be noted that with further use or processing, erect portions 60 may also be forced down parallel to surface 20.

A reinforcing fabric (not shown in FIG. 1) may optionally be utilized and in the case of V-belts and multi-V-ribbed belts intimately fits along the top surface of a belt to form a face cover or overcord 12 for the belt. The fabric may be of any desired configuration such as a conventional weave consisting of warp and weft threads at any desired angle, or may consist of warp threads held together by spaced pick cords as exemplified by tire cord fabric, or of a knitted or braided configuration, or of a nonwoven configuration, or paper, or plastic film, and the like. The fabric may be friction- or skim-coated with the same or different elastomer composition as that of elastomeric main belt body 18. More than one ply of fabric may be employed. If desired, the fabric may be cut or otherwise formed to be arranged on a bias so that the strands form an angle with the direction of travel of the belt. A fabric layer may reside between cord 14 and overcord 12.

Embodiments of the present invention may be made according to methods known in the belt-manufacturing arts. For example, a slab may be built up inverted on a mandrel by applying to the mandrel overcord, helically wound cord, and undercord. The slab may be cured by applying external pressure through a flexible sleeve. Individual belts may be cut from the sleeve and profiled using grinders and/or cutters which form the pulley contact surface and expose embedded short fibers so that portions of at least some fibers protrude from the contact surface according to an embodiment of the present invention. A grinding process is disclosed for example in each of U.S. Pat. Nos. 4,956,036 and 6,764,382. A cutting process is disclosed for example in U.S. Pat. Publication No. 2006/0236839. The deformation of the protruding fibers of embodiments of the present invention may best be obtained by allowing the grinding or cutting tool to heat the belt contact surface to and/or the tool itself to just a temperature at which the fibers soften enough to deform, but no hotter. The resulting deformed fiber generally has a smooth surface appearance. If the temperature or heat generated by grinding or cutting is excessive, the softened fibers will be weakened, cut off too short, splayed or flared, and/or deformed excessively, for example into a thin ribbon configuration. If the temperature or heat generated is insufficient and does not soften the fibers, the fibers may be mechanically roughened, abraded, cut short, or split and flared. Cutting processes may generally run cooler than grinding processes, although either process can be controlled over a fairly broad temperature range by adjusting tool rotational speeds, feed rates, grit density, and the like as known in the art. In addition, various external cooling methods may be used to control the process temperature, including for example, liquid nitrogen, cold air gun or blower, water spray, and the like.

Example multi-v-ribbed belts (indicated by "Ex." and a number) according to embodiments of the invention were constructed and tested to demonstrate the usefulness and advantages of the present invention. For comparison, comparative examples (indicated by "Comp. Ex." and a letter) were also constructed. All belts had polyester cord and EPDM elastomer belt body like the examples of U.S. Pat. No. 5,610,217 and could be described as 6PK1200. The belts, however, had either 25 parts per hundred parts of elastomer ("phr") of chopped nylon-66 fibers of average length 1 mm, or 6 phr of chopped Nomex fibers of average length 1.5 mm. The elastomer recipe had a total of about 200 parts. The nylon fibers were also round with original average diameter of either 20 microns or 30 microns as indicated in Table 1. The Nomex fibers were not round, having a dual-lobed shape as illustrated in FIG. 4F and fiber 50 in FIG. 5. The example belts had a rib profile produced by cutting, with protruding fiber portions as shown in FIGS. 2, 3, and 5, and having typical deformed dimensions as indicated in Table 1. The comparative examples had rib profiles produced by grinding, with protruding fiber configurations similar to fibers 1c, 1e, 1g, and/or 1h in FIG. 1, predominantly flared, thin fibers similar to 1h, and typical dimensions as indicated in Table 1. The typical dimensions were obtained by selecting a typical-looking fiber from low-magnification SEM micrographs and measuring the dimensions of that fiber from a high-magnification SEM micrograph. When a range of dimensions is indicated in Table 1, the variation observed in the specimens was significant. It should be noted that determining the W dimension was the most difficult, especially for very thin Comp. Ex.'s. Therefore, the L/D measurement may be a more accurate indication of the fiber deformation. The % elongation was simply calculated from L/D in Table 1.

The example belts were tested to demonstrate the utility and durability and performance advantages of embodiments of the present invention. Durability analysis involved running test belts on a five-point flex life test and a heated, load and flex life test. All belts passed the durability analysis. Noise tests involved running belts on misaligned pulleys under both wet and dry conditions. Initial tests were run on newly made belts, which, in the case of the example belts, had substantially erect protruding fibers according to embodiments of the invention. Conditioned tests involved the same noise testing as the initial tests, but after conditioning the belts for 96 hours on the above-mentioned heated, load and flex life tester. Thus, the conditioned example belts had protruding fibers that were bent over toward the rubber surface. While all belts ran quietly for the initial noise testing and for the dry noise testing after conditioning, only the example belts ran quietly in wet noise tests after conditioning. Thus, embodiments of the invention exhibit durability and quiet operation in a variety of conditions and over a long period of use.

Other embodiments of the present invention may be envisioned. For example, multi-lobed thermally deformable fibers may be used, such as three-lobed polyimide or polyamide-imide fibers including P84 fibers sold under that trade name by Inspec Fibres, a Degussa company.

TABLE 1

|  | Belt Examples | | | | | |
| --- | --- | --- | --- | --- | --- | --- |
|  | Ex. 1 | Comp. Ex. A | Ex. 2a | Ex. 2b | Comp. Ex. B | Ex. 3 |
| Fiber type | nylon-66 | nylon-66 | nylon-66 | nylon-66 | nylon-66 | Nomex |
| Fiber D (μm) | 20 | 20 | 30 | 30 | 30 | 16-21 |
| Fiber length (mm) | 1.0 | 1.0 | 1.0 | 1.0 | 1.0 | 1.5 |
| Profile process | cutting | Grinding | cutting | cutting | grinding | cutting |
| Fiber shape | FIGS. 2-4 | ~FIG. 1h | FIGS. 2-4 | FIGS. 2-4 | ~FIG. 1h | FIG. 5 (50) |
| Length H (mm) | 0.05-0.20 | 0.05-0.10 | 0.10-0.45 | 0.05-0.25 | 0.10-0.20 | 0.05-0.30 |
| H/D | 2.5-10 | 2.0-5 | 3.0-15 | 3.0-10 | 5 | 10 |
| L/W | 4.0 | 10 | 2 | 2.5 | 7-20 | 2.0-5.0 |
| L/D | 1.8 | 2.5 | 1.3 | 1.5 | 3.0 | 1.1-2.0 |
| % elongation | 80% | 150% | 30% | 50% | 200% | 10-100% |
| Durability analysis | pass | Pass | pass | pass | pass | pass |
| Initial Noise - Dry | quiet | Quiet | quiet | quiet | quiet | quiet |
| Initial Noise - Wet | quiet | Quiet | quiet | quiet | quiet | quiet |

TABLE 1-continued

| | Belt Examples | | | | | |
|---|---|---|---|---|---|---|
| | Ex. 1 | Comp. Ex. A | Ex. 2a | Ex. 2b | Comp. Ex. B | Ex. 3 |
| Conditioned Noise - Dry | quiet | Quiet | quiet | quiet | quiet | quiet |
| Conditioned Noise - Wet | quiet | Chirp | quiet | quiet | chirp | quiet |

Although the present invention and its advantages have been described in detail, it should be understood that various changes, substitutions, and alterations can be made herein without departing from the spirit and scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A power transmission belt comprising a tensile member, an elastomeric belt body having a plurality of discontinuous deformable fibers embedded therein, and a pulley contact surface;
    with each said fiber characterized by an original average fiber diameter and having an original cross-sectional shape that is substantially unchanged for embedded portions of the fiber; and
    with a plurality of fiber ends protruding substantially erect from said contact surface and substantially straight or slightly bowed and having a protruding length and having a protruding cross-sectional shape that is substantially uniformly deformed from the original cross-sectional shape along substantially all the protruding length.

2. The belt of claim 1 wherein the original shape is substantially round and the plurality of protruding fiber ends are deformed from the round shape to one or more of an oval, kidney, oblong, and semicircular cross-sectional shape.

3. The belt of claim 1 wherein the original shape is oval or dumbbell shaped and the protruding cross-sectional shape is deformed to a more elongated oval or dumbbell shape.

4. The belt of claim 1 wherein the discontinuous fibers have an average length of from about 0.5 to about 5 mm, and an original average diameter of from about 10 microns to about 50 microns.

5. The belt of claim 1 wherein the discontinuous fibers have an average length of from about 1 mm to about 3 mm, and an original average diameter of from about 20 microns to about 30 microns.

6. The belt of claim 1 wherein said protruding length is at least 2 original average fiber diameters.

7. The belt of claim 1 wherein said protruding length is from about 5 to about 20 fiber diameters.

8. The belt of claim 1 wherein said deformable fiber is one or more selected from the group consisting of nylon-6, nylon-46, nylon-66, acrylic, polyester, polyketone, and polyolefin.

9. The belt of claim 1 wherein the deformable fiber has a softening point of greater than about 100° C.

10. The belt of claim 1 wherein said deformable fiber is nylon.

11. The belt of claim 1 wherein said fiber deformation is characterized by a ratio of a major dimension to a minor dimension is in the range from about 1.2 to about 5.

12. The belt of claim 1 wherein said fiber deformation is characterized by a major dimension that is elongated by from about 10% to about 100%.

13. The belt of claim 1 wherein said elastomeric belt body comprises one or more selected from EPDM, EPM, SBR, BR, NR, CR, NBR, HNBR, and ethylene-alpha-olefin elastomer.

14. The belt of claim 1 wherein the average surface roughness of the contact surface is more than 10 microns and irregular.

15. The belt of claim 1 wherein the amount of said fiber in said elastomeric belt body is from about 1-50 phr based on 100 parts of elastomer.

16. The belt of claim 1 wherein the number of exposed fibers on the contact surface is in the range from 20 to 150 fibers per $mm^2$.

17. The belt of claim 1 wherein most of the protruding fibers are bent at the roots and the protruding portions substantially parallel to the contact surface.

18. The belt of claim 1 wherein most of the protruding fibers are bent at the roots with at least a portion of the protruding portions substantially parallel to and very close to or touching the contact surface.

19. The belt of claim 18 wherein at least some of the bent protruding fibers have a substantially erect portion at the free end.

20. A power transmission belt comprising a tensile member, an elastomeric belt body having a plurality of discontinuous deformable nylon fibers embedded therein, and a pulley contact surface;
    with each said fiber characterized by an original average fiber diameter and having an original cross-sectional shape that is substantially unchanged for embedded portions of the fiber; and
    with a plurality of fiber ends protruding substantially erect from said contact surface and substantially straight for the entire protruding length and having a protruding cross-sectional shape that is substantially uniformly deformed from the original cross-sectional shape along the entire protruding length.

21. The belt of claim 20 wherein at least some of said plurality of fibers ends protruding substantially erect are slightly bowed near the exposed end, and said bow is generally unidirectional.

22. The belt of claim 21 wherein said substantially uniformly deformed cross-sectional shape is an oval shape.

23. The belt of claim 22 wherein said deformed protruding fiber ends are not split, splayed, melted or flared.

24. The belt of claim 23 wherein said fiber deformation is characterized by a major cross-sectional dimension that is elongated by from about 10% to about 100%.

* * * * *